Aug. 31, 1943.　　　J. DE KONING　　　2,328,428
GRAVITY SEPARATOR FOR COAL
Filed Oct. 4, 1941

Inventor
Jacob de Koning,
By A. M. Holcombe
Attorney

Patented Aug. 31, 1943

2,328,428

UNITED STATES PATENT OFFICE 2,328,428

GRAVITY SEPARATOR FOR COAL

Jacob de Koning, Treebeek, Limburg, Netherlands; vested in the Alien Property Custodian Application October 4, 1941, Serial No. 413,700
In the Netherlands March 1, 1939

2 Claims. (Cl. 209—173)

This invention relates to the maintaining of unstable suspensions of solid matter in liquids during the separation of coal and rock as described in my co-pending application for United States Patent, Serial Number 288,955, of which the present application is a continuation-in-part.

It more particularly relates to the maintaining of unstable suspensions of low viscosity which suspensions are used for separating solid materials of different specific gravity, more particularly of coal and rock from mixtures containing same.

It is an object of this invention to provide means allowing the maintenance of unstable suspensions of low viscosity thus permitting a merely static separation of coal and rock.

It is another object of this invention to provide an apparatus for carrying out this process.

Other objects of this invention will appear as the specification proceeds.

It is known, that coal and rock may be separated from mixtures containing same, by means of a heavy liquor, the specific gravity of which is between that of the components of the mixture to be separated.

These liquors have to fulfill following conditions:

1. The specific gravity of the liquor has to be constant, or nearly constant throughout the bath, in which the separation is to be carried out.
2. The viscosity of the liquor must be low enough to permit free movement of the product in the bath.
3. The liquid attached to the discharged products should be readily separable from these products.
4. The liquid, separated from the discharged products should be readily regeneratable.
5. The means, used to meet these conditions, should not influence the separation in an unfavourable way.

The liquids, used hitherto, for this purpose are:

1. Undiluted liquids.
2. Solutions.
3. Suspensions.

The liquids mentioned under 1 and 2 are expensive, while the regeneration requires costly installations. Therefore these liquids are not generally used.

The suspensions, mentioned under 3 which are worth considering are limited, because of the difficulty of making them fulfill the conditions mentioned under 1 and 2 at the same time.

A suspension which is sufficiently stable generally has a high viscosity. On the other hand, a suspension having a permissible viscosity, generally is unstable.

These inconveniences are met as a rule by the addition to stable suspensions of satisfactory viscosity loading materials, imparting to the suspensions the required specific gravity.

Or one may maintain unstable suspensions constant by adding very finely comminuted materials or chemicals. By way of example the well known baryta-clay suspension may here be mentioned. But these suspensions also present drawbacks, especially in the regeneration of the comminuted materials or chemicals.

Avoidance of these disadvantages has been attempted by using unstable liquid suspensions of solid matter and by maintaining the solid matter suspended by means of upward currents often in combination with stirring of the liquid. The upward currents however, have an unfavourable influence on the separation. In consequence of these upward currents the heavy particles of relative small size rise and are discharged with the coal. It is clear, that a merely static separation in this way is impossible. Many improvements have been proposed to avoid as much as possible these influences, but hitherto none of them have succeeded.

Therefore it has not been possible to profit by the great advantages offered by these unstable suspensions of low viscosity these advantages being that they are cheap, easily obtainable, easily separated from the discharged products and easily regenerated.

By "unstable suspensions" I wish to designate suspensions which have a top sedimentation of more than 5% during half an hour at a temperature of about 20° C. and at a specific gravity of 1.5, having in this condition a viscosity of about 18 centipoises.

According to this invention the solid matter is kept in suspension exclusively by means of the disturbance, which is created by the means for discharging the products, the means for discharging the lighter, floating products moving substantially horizontally, close to the surface of the liquid, while the means for discharging the heavier, sinking products, move substantially parallel to said first means and both means travel so close to each other, that the zones of disturbance merge into each other.

Furthermore the effect can be increased according to the invention by continuously mixing liquid, drained from the lighter discharged products, with that part of the liquid, containing the sunken products.

The apparatus, in which this process is carried out, consists of a shallow trough containing an endless scraperchain, the lower reach of which chain is travelling along and closely adjacent to the bottom of the trough, while the upper reach travels substantially below but close to the level of the suspension, the suspension almost completely filling the trough. The apparatus further contains means for supplying the mixture to be separated.

In the drawings affixed to this specification and forming part thereof several embodiments of my invention are illustrated diagrammatically by way of example.

In the drawing:

Fig. 2 is a longitudinal sectional view of a modified apparatus in accordance with the invention, while

Figure 1:
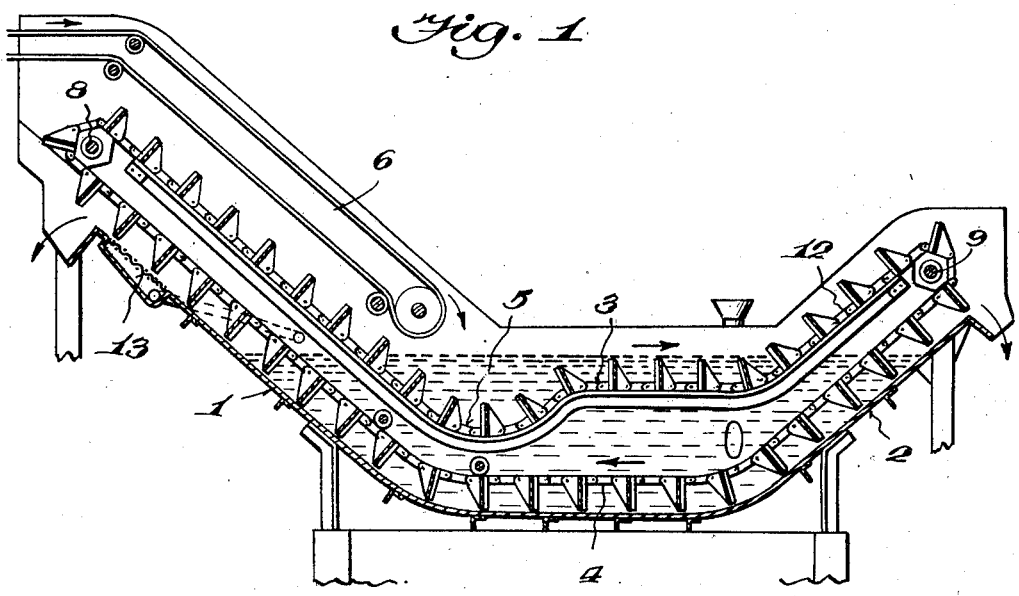
Fig. 1 is a longitudinal sectional view of an apparatus embodying the present invention.
Figure 2:
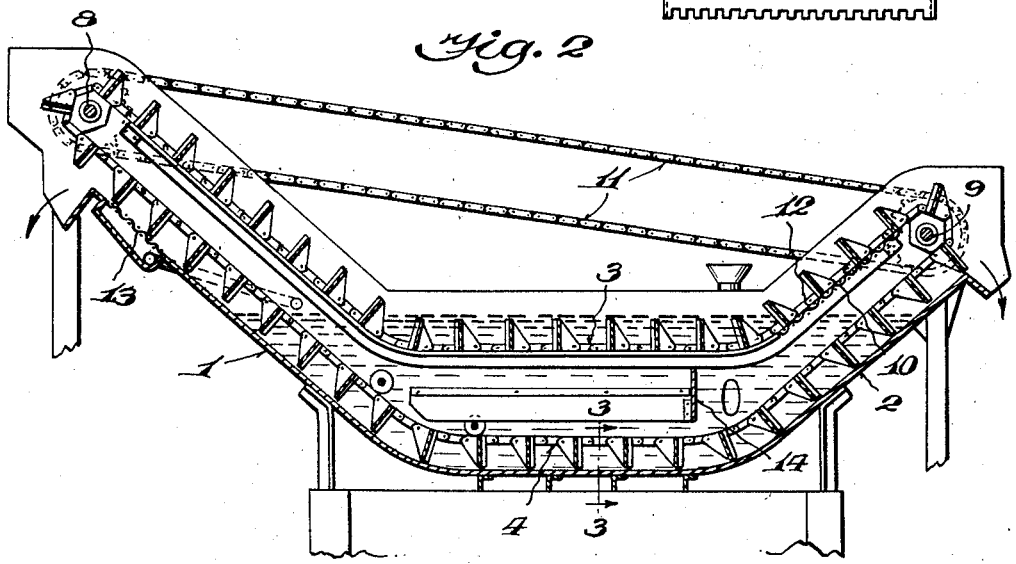

Referring to the drawing and first to Fig. 1, 1 and 2 are the sloping end walls of a washing trough or tank, the front and rear walls of which are vertical or nearly vertical and extend substantially in parallel with the plane of the drawing. 6 is a conveying device for supplying the mixture to be separated to the liquor placed in the tank. A scraper band, arranged in the tank is kept moving by the axles 8 and 9, driven by any kind of motor (not shown). This scraper band is arranged to travel along the sloping end walls 1 and 2 and at the bottom of the tank, while its part 3 travels close to the level of the liquor placed in the tank. Part 3 of the scraper band carries along the floating portions of the mixture supplied to the bath, while the sinking portions of the mixture are caught and conveyed by part 4 of the scraper band.

The scraping member in travelling along those walls, which do not extend vertically prevents the deposition of suspended particles on these walls. Surprisingly it has been found, that the disturbance surrounding the scraperchain travelling through the liquid is sufficient to maintain constant the unstable suspensions of the type mentioned above.

The parts 3 and 4 may be arranged in closely spaced relation, more particularly the part 3 is not formed with a depression. Care must, however, be taken not to arrange them so closely, that the products might be squeezed between the parts 3 and 4 and might thus be crushed. The distance between the parts 3 and 4 of the scraping chain should therefore be at least twice as large as the greatest diameter of the parts of the mixture to be separated.

On the other hand the distance between these parts of the scraper chain should not exceed 5 times the height of the scrapers.

In the modification shown in Fig. 1 the scraping band is formed with a depression 5, which leaves the surface of the liquor locally free so that the material to be separated and supplied by the conveyor 6 is prevented from being crushed on the scraping chain.

In the modification shown in Fig. 2 no separate conveyor member is provided, but the material is supplied to the bath by means of the scraping band itself and more particularly by that portion which is designated by 7. In this modification a plate 15 is preferably arranged underneath the part 7 of the scraping member and parallel therewith.

Figure 3:
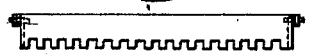
Fig. 3 is a cross section of the scraper band on the line III—III of Fig. 2.

The movement brought about in the separating liquor by the scrapers and the tendency of banking up the suspension along the bottom and the side walls of the tank may be limited, if necessary, by the use of a scraping band the scrapers of which are formed with perforations or teeth as shown in Fig. 3. These teeth or perforations further cause the suspension carried along by the scrapers at 1 to flow directly back into the tank. In order to diminish the load acting on the scraping member and in order to maintain the original form in which the scraping band is arranged in the tank so that guide-pulleys may be dispensed with, the scraping band is preferably driven by a plurality of shafts, each of which imparts to the scraping band the same velocity. A suitable manner of effecting such drive consists in connecting these shafts with each other free from any slip, for instance by means of the chain 11 shown in Fig. 2.

In order to discharge the separated materials substantially free of adhering suspension, the discharge may preferably take place by means of straining plates or sieves over which the mixture is conducted. Those portions which float may be discharged by means of the part 12 of the scraper band with the aid of the straining plate 10. Those portions which settle are discharged over the end wall 1 of the tank. At 13, this end wall is formed above the level of the liquor, with perforations so as to act as a straining plate. The parts of the suspension which trickle through the straining plate are returned into the tank by means of runners and an aperture in the vertical wall of the tank.

As shown in Fig. 2 a plate 14 may be arranged in order to divide the trough into two parts, leaving however a small communication close to the bottom of the trough, the dimensions of which communication are just sufficient to pass the lower reach of the scraper chain. In this way the liquid drained from the discharged floating products can reenter the separating bath only near the bottom so that this liquid is mixed with the lower part of the separating liquid.

The present invention allows washing for instance by means of mixed suspensions of sand and clay, the stability of which is considerably lower than that of a baryta-clay or of a loess suspension.

The invention further allows washing with a suspension of "tailings," i. e., fine particles of rock and pyrite derived from the material to be separated.

The invention is of importance when washing with a loess suspension, for instance if a mixed suspension of loess with a substance of high specific weight such as magnetite is used or in the case that for instance in the separation of fine coals suspensions are employed, the viscosity of which has been lowered by an admixture of other substances known in the art.

The invention gives the possibility of separating coal and rock by means of suspensions, which are very unexpensive. Only a simple system for the regeneration of the bath is required.

I wish it to be understood that I do not desire to be limited to the exact details of construction shown and described, for obvious modifications will occur to a person skilled in the art.

I claim:

1. A gravity separator for coal for use with a liquid suspension maintained substantially constant by agitation, comprising a trough with oppositely sloping end walls, a liquid suspension in said trough of a specific gravity intermediate the specific gravities of the materials to be separated, an endless chain scraper, the lower run of said scraper extending along and closely adjacent to the bottom and end walls of said trough for the removal of the heavy material, the upper run of said scraper extending substantially near the level of the liquid suspension, the two runs being spaced from each other not more than five times the height of the chain scraper, means for supplying the mixture to be separated at the side of the trough opposite from the point of discharge of the floating material and a depression formed in the upper run of said chain below said supplying means approximately as deep as the height of the scrapers for preventing the supplied mixture from being crushed by said chain scraper.

2. A gravity separator for coal for use with a liquid suspension maintained substantially constant by agitation, comprising a trough with oppositely sloping end walls, a liquid suspension in said trough of a specific gravity intermediate the specific gravities of the materials to be separated, an endless chain scraper, the lower run of said scraper extending along and closely adjacent to the bottom and end walls of said trough for the removal of the heavy material, the upper run of said scraper extending substantially near the level of the liquid suspension, a strainer arranged to receive the floating material and a second strainer arranged to receive the heavier material, and means shielding that part of the trough in which the separation is carried out from the part in which the liquid suspension drained from the floating material is received, leaving a passageway of limited height between both parts of the trough close to the bottom thereof, the dimensions of said passageway being just sufficient to allow the lower run of the chain scraper to pass.

JACOB DE KONING.